455-296 SR CROSS REFERENCE
FIP8106 XR 3,821,482
1A 37 J4E

United St

Hirsch

[11] 3,821,482

[45] June 28, 1974

[54] NOISE SPECTRUM EQUALIZER UTILIZING SPECTRUM INVERSION

[75] Inventor: Peter Hirsch, Parsippany, N.J.

[73] Assignee: Bell Telephone Laboratories Incorporated, Murray Hill, N.J.

[22] Filed: May 3, 1973

[21] Appl. No.: 356,919

[52] U.S. Cl. ...... 179/15.55 R, 324/77 B, 333/28 R, 333/18, 179/1 P, 325/473

[51] Int. Cl. ........................................ H04b 1/66

[58] Field of Search ....... 179/15.55 R, 15.55 T, 1 P, 179/1 SA, 100.2 K; 333/28 R, 28 T, 18; 325/473, 474; 178/DIG. 12; 324/77 B; 235/152, 156

[56] References Cited

UNITED STATES PATENTS

| | | | |
|---|---|---|---|
| 2,866,001 | 12/1958 | Smith | 179/15.55 R |
| 3,091,665 | 5/1963 | Schroeder | 179/15.55 R |
| 3,717,812 | 2/1973 | Hirsch | 324/77 B |

*Primary Examiner*—Kathleen H. Claffy
*Assistant Examiner*—Thomas D'Amico
*Attorney, Agent, or Firm*—G. E. Murray

[57] ABSTRACT

Apparatus for noise spectrum equalization of applied power spectrum samples for enhancing detection of signals embedded in noise. Equalization is achieved through inversion of applied spectrum samples followed by division of each applied spectrum sample by an associated neighborhood-mean equalizing signal generated by computing the average amplitude of a predetermined number of inverted samples in the vicinity of the associated applied spectrum sample. The use of inverted samples in computing the equalizing signal results in noise spectrum equalization apparatus that is insensitive to the unwanted effects of strong signals.

10 Claims, 10 Drawing Figures

3821482
OR IN 179/15.55R

NOISE SPECTRUM EQUALIZER UTILIZING SPECTRUM INVERSION

GOVERNMENT CONTRACT

The invention herein claimed was made in the course of or under a contract with the Department of the Navy.

BACKGROUND OF THE INVENTION

This invention relates to signal detection in the presence of noise and, more particularly, to apparatus for automatically equalizing the power spectrum of input signals prior to signal detection.

In the art of signal detection numerous occasions arise when input signals contain noise of sufficient magnitude to constitute an impediment to signal detection. To overcome this problem, various methods are used to extract the desired signal from the accompanying noise. These methods include measurements of incoming broadband power, statistical analysis of incoming power, cepstrum analysis, cross correlation, filtering of particular frequency bands, detailed spectrum analysis, and others. When the method of spectrum analysis is used, the spectrum is generally searched for a known behavior or characteristic of the desired signal.

In some applications which use the spectrum analysis method, the absolute spectrum level is not critical, because the signal-to-noise ratio contains the information sought. In such systems, equalization of the analyzed spectrum, relative to noise power, is advantageous because it allows for more uniform and, hence, more automated treatment of the signal detection task.

In the prior art, such equalization is done in a manner similar to that described by C. P. Smith, U.S. Pat. No. 2,866,001. In the Smith system the input signal is passed through a plurality of contiguous bandpass filters and the power output of the filters is used to control the gain of a plurality of amplifiers connected to each filter, thereby obtaining a relatively fixed total power output from each amplifier. Subsequently, the amplifiers' outputs are summed, resulting in a signal which exhibits an equalized spectrum. The bandwidth of these filters must be wide compared with the bandwidth of anticipated signals because, otherwise, the signals would be "equalized" out of existence. However, with filters of wide bandwidth, a strong signal located anywhere within the band of a particular filter affects the amplifier's output throughout the band, causing a depression of the spectrum in the neighborhood of the strong signal, and causing attenuation of the signal itself. This is undesirable because with automatic signal detection such a depression may prevent the detection of neighboring weak signals.

SUMMARY OF THE INVENTION

It is, therefore, an object of this invention to provide apparatus for noise spectrum equalization.

It is another object of this invention to provide equalization apparatus that is insensitive to the effects of strong signals.

It is another object of this invention to provide apparatus that digitally manipulates signals in the frequency domain to achieve noise spectrum equalization.

In accordance with these and other objects noise spectrum equalization is achieved through the use of apparatus which operates on applied power spectrum samples of the signal to be analyzed. The apparatus inverts all applied spectrum samples and equalizes each spectrum sample by interacting each spectrum sample with an associated neighborhood-mean equalizing signal. The apparatus derives this neighborhood-mean equalizing signal by averaging a preselected number of the inverted spectrum samples in the neighborhood, i.e., on either side, of the interacting sample.

The present invention thus overcomes spectrum depression due to large signals because inversion of spectrum samples converts large signals into small signals, thereby diminishing their effect. For example, in a prior art system, an extremely large signal, which may manifest itself as a plurality of adjacent spectrum samples exhibiting an excessively large amplitude, has overbearing dominance over the spectrum about the large signal (the neighborhood on either side of the signal) because the applied samples are used in the equalizing signal computations. Consequently, the equalized samples within the neighborhood of the strong signal are drastically reduced. In this invention, to the contrary, an extremely large signal has near zero effect on the equalized spectrum in its neighborhood because inverted samples are used in the equalizing signal computations. Thus, the equalized spectrum is not depressed in the neighborhood of the large signal, and the large signal itself is not severely diminished. Consequently, weak signal detection in the neighborhood of strong signals is enhanced by this invention.

One feature of this invention is the use of a frequency window which defines the extent of the averaging neighborhood, and which traverses the spectrum to obtain the desired neighborhood-mean equalizing signals for all spectrum samples.

Another feature of this invention is the capability to operate on sequentially applied spectrum samples or on stored spectrum samples.

Still another feature of this invention is the reduced arithmetic hardware required to handle large dynamic ranges, because the maximum signal of the inverted spectrum is advantageously bounded, with impunity.

These and other objects, features, and advantages of the invention will become apparent to those skilled in the art in view of the following detailed description of the invention, taken in conjunction with the accompanying drawing wherein:

DETAILED DESCRIPTION

Figure 1:
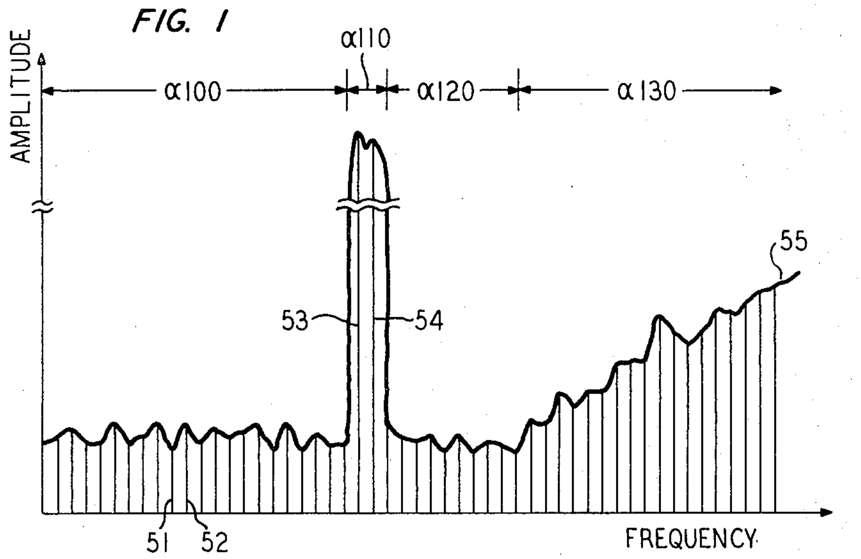
FIG. 1 is an illustration of a sampled power spectrum typically applied to a noise spectrum equalizer.

FIG. 1 illustrates a typical sampled power spectrum signal applied to a noise spectrum equalizer. This sampled spectrum signal may be obtained by performing spectrum analysis of the signal to be equalized with any suitable spectrum analyzer, such as, for example, an FFT analyzer described by R. A. Smith in U.S. Pat. No. 3,588,460. The frequency spacing between adjacent power spectrum samples, such as samples 51 and 52 in FIG. 1, is related to the length of the time-function signal at the spectrum analyzer's input. Envelope 55 is provided merely to facilitate an appreciation of the general spectrum characteristics of the signal. Accordingly, it can be observed that region $\alpha$100 in FIG. 1 represents a generally flat noise spectrum signal, region $\alpha$110 represents a strong signal (composed of two samples 53 and 54), region $\alpha$120 represents a relatively flat noise spectrum signal, and region $\alpha$130 represents a generally rising noise spectrum signal.

Figure 2:
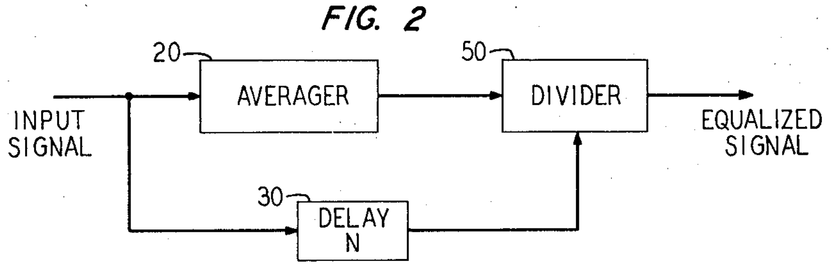
FIG. 2 is a block diagram of a prior art noise spectrum equalizer.

FIG. 2 depicts a prior art noise spectrum equalizer, disclosed in the copending application of H. T. Brendzel et al. Ser. No. 356,918 filed May 3, 1973, responsive to sequentially applied spectrum samples, such as shown in FIG. 1. It comprises averager 20, responsive to applied spectrum samples, for generating a neighborhood-mean equalizing signal, delay means 30 for delaying the applied spectrum samples, and divider 50 for generating the equalized spectrum by dividing the delay means 30 output signal by the averager 20 output signal.

Figure 3:
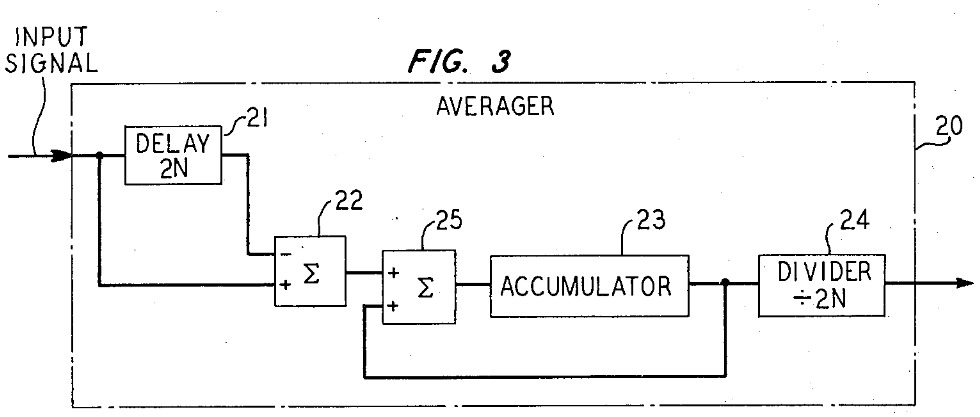
FIG. 3 is a detailed block diagram of the averager used in the apparatus shown in FIG. 2.

The neighborhood-mean equalizing signal generated by averager 20, is a signal which at any one time represents a computed amplitude average of the 2N spectrum samples most recently applied to averager 20. One embodiment of averager 20 is shown in FIG. 3. In this embodiment, spectrum samples are applied to subtractor 22 (positive input), and are applied to delay element 21 which provides delay and storage of 2N samples. Delay element 21 output signal is applied to subtractor 22 (negative input) and the resultant difference signal is applied to summer 25, first input. Summer 25 output signal is inserted into accumulator register 23, while the output of register 23 is connected to summer 25, second input, and to divider 24. Divider 24 divides its applied input signal by 2N thus achieving the required result, i.e., a neighborhood-mean equalizing signal representative of the average amplitude of the 2N most recently applied spectrum samples.

The equalizing signal generated by averager 20 interacts with an applied spectrum sample situated in the center of the 2N sample frequency window so that the average derived by averager 20 corresponds to an average of samples on either side of the interacting applied spectrum sample. In other words, the average is a neighborhood average of the interacting sample. To provide for this requirement, delay element 30 of FIg. 2 stores and delays N spectrum samples so that the spectrum sample appearing at its output corresponds to the center of the frequency window as defined by averager 20. In other words, the equalizing signal for each spectrum sample comprises N samples at frequencies higher than said spectrum sample, the sample itself, and N−1 samples at frequencies lower than said spectrum samples. With the above signal timing preconditioning, divider 50 achieves the desired spectrum sample equalization by dividing the spectrum sample supplied by delay element 30 by the neighborhood-mean equalizing signal of averager 20. The resultant sequence of equalized spectrum samples emanating out of divider 50 comprises the equalized spectrum.

Figure 4:
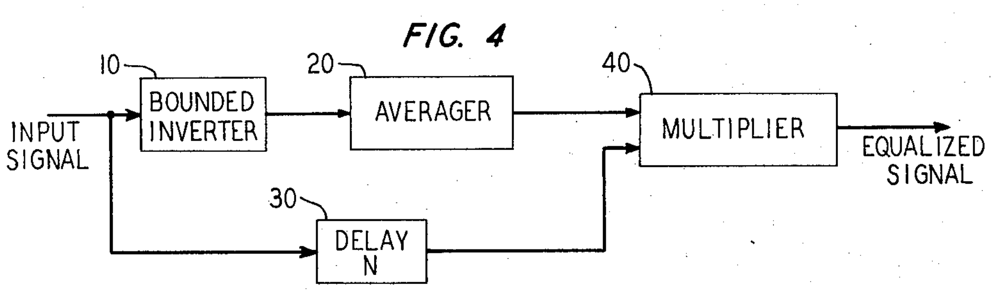
FIG. 4 is a block diagram of a noise spectrum equalizer using the principles of this invention.

One embodiment of a noise spectrum equalizer in accordance with this invention, operating on sequentially applied spectrum samples, is shown in FIG. 4. In this embodiment, bounded inverter 10, responsive to sequentially applied spectrum samples, places a lower bound on the amplitude of the applied samples, i.e., clamps, and inverts each bounded sample. For example, an applied spectrum sample of amplitude 10, on an arbitrary scale, is transformed to 1/10, an applied sample of amplitude ½ is transformed to 2, but an applied sample of amplitude of 1/1000 is clamped to 1/10 and converted to 10. Inverted samples from device 10 enter averager 20 where an equalizing signal is generated as described above in the discussion of the prior art system. The resultant equalizing signal is applied to one input of multiplier 40. Since averager 20 generates an average signal of the 2N most recently applied spectrum samples, and since equalization relates the equalizing signal to a spectrum sample in the center of its frequency window (to constitute a neighborhood-mean equalizing signal), the signals applied to the second input of multiplier 40 must be synchronized. Accordingly, applied spectrum samples are stored in delay means 30 which provide the proper N sample delay, and the output of delay means 30 is connected to the second input of multiplier 40. Multiplier 40 equalizes each spectrum sample supplied by delay means 30 by multiplying each sample by the neighborhood-mean equalizing signal of averager 20. The resultant sequence of equalized samples developed by multiplier 40 comprises the equalized spectrum.

Figure 5A:
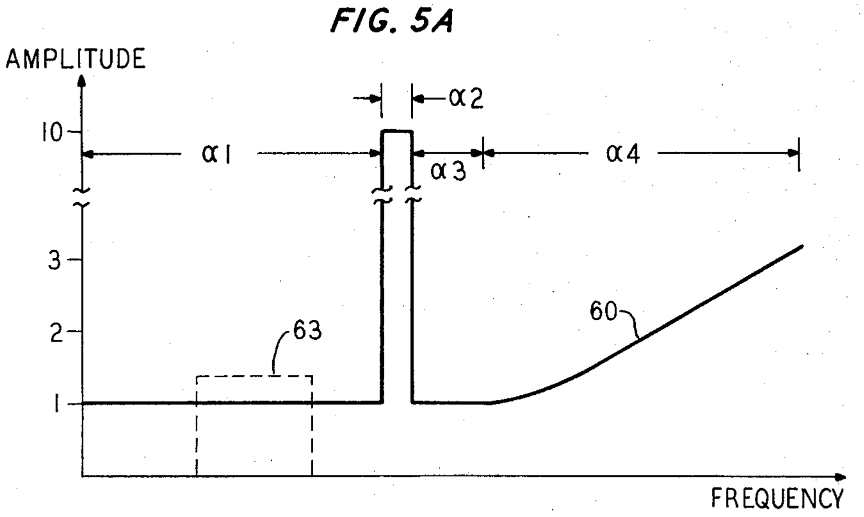
FIGS. 5A, 5B and 5C illustrate a possible set of spectra at various points within the prior art system of FIG. 2.

The operation, features, and advantages of this invention can be more fully understood by comparing the response of a prior art noise spectrum equalizer and the response of the noise spectrum equalizer of this invention to an applied spectrum signal. Accordingly, a smooth spectrum signal, as depicted by its envelope in FIG. 5A, is applied to the prior art noise spectrum equalizer of FIG. 2 and to the improved noise spectrum equalizer of FIG. 4. This applied spectrum has the following characteristics. The spectrum in region $\alpha$1 is relatively flat, at a level, e.g., of 1 volt. The spectrum in region $\alpha$2 is at high level and flat, corresponding to a strong signal at a level of 10 volts. The spectrum in region $\alpha$3 is relatively flat, again at 1 volt, and, the spectrum in region $\alpha$4 is generally rising. Dotted rectangle 63 represents the width of the frequency window of averager 20, used in this example, which effectively traverses the spectrum while the equalizing signal is generated.

Figure 5B:
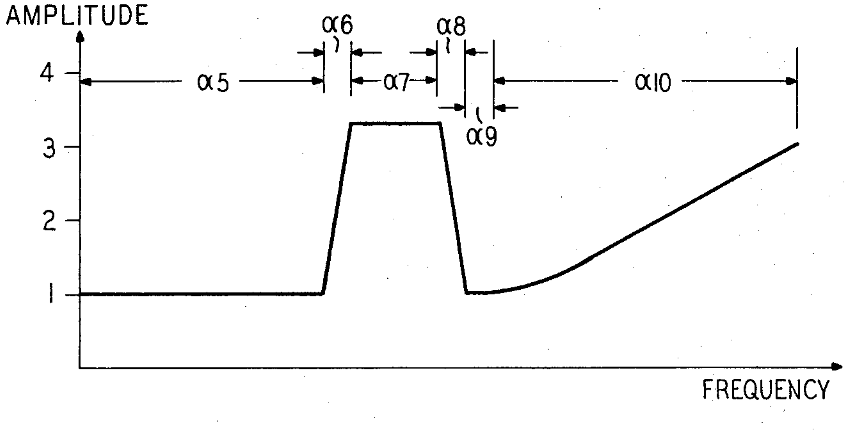

FIG. 5B depicts the equalizing signal of averager 20, within the prior art equalizer, in response to the applied spectrum of FIG. 5A. This equalizing signal exhibits the following characteristics. The equalizing signal in region $\alpha$5 is relatively flat, corresponding to the flat spectrum average of region $\alpha$1. The signal in region $\alpha$6 is generally rising, corresponding to the gradual inclusion of the strong signal in the neighborhood-mean computation, as frequency window 63 begins to encompass the strong signal. The equalizing signal in region $\alpha$7 is flat, and at a high level, corresponding to the total inclusion of the strong signal within frequency-window 63. The signal in region $\alpha$8 is a generally declining equalizing signal, corresponding to the gradual exclusion of the strong signal from the neighborhood mean. The equalizing signal in region $\alpha$9 is relatively flat corresponding to the average of the relatively flat spectrum of region $\alpha$3. And, the signal in region 10 is a generally rising equalizing signal, in response to the rising spectrum of region $\alpha 4$.

Figure 5C:
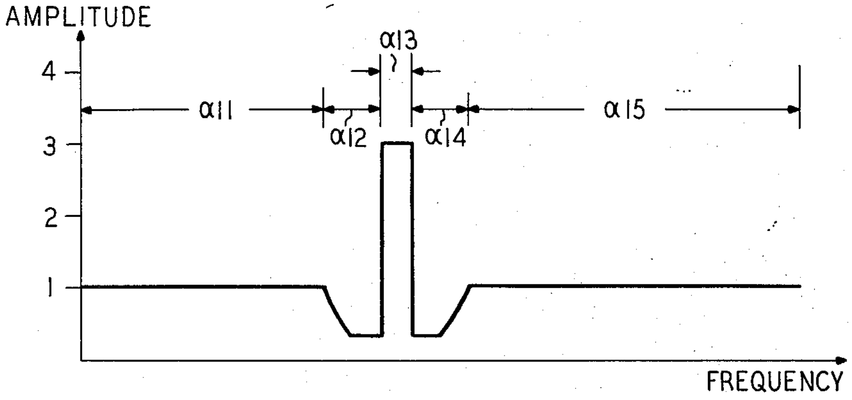

The equalized spectrum of the prior art equalizer, which is the output of divider 50, is shown in FIG. 5C. It has the following characteristics. The equalized spectrum in region $\alpha 11$ is relatively flat, at 1 volt, corresponding to the flat spectrum of region $\alpha 1$. The equalized spectrum in regions $\alpha 12$ and $\alpha 14$ is depressed to approximately 0.3 volts (70 percent depression), due to the effect of the strong signal of region $\alpha 2$, as displayed by the equalizing signal in regions $\alpha 6$, $\alpha 7$, and $\alpha 8$. The equalized spectrum in region $\alpha 13$ appears as a detectable signal, but is attenuated from 10 volts to approximately 3 volts (again a 70 percent loss). The equalized spectrum in region $\alpha 15$ is relatively flat, and it corresponds to the flat spectrum in region $\alpha 3$ and to the rising spectrum in region $\alpha 4$.

Clearly, the relatively flat equalized spectrum in regions $\alpha 11$ and $\alpha 15$ is in accord with the objectives of equalization. It is also clear that the equalized spectrum in depressed regions $\alpha 12$ and $\alpha 14$ is undesirable. Further, the signal attenuation in region $\alpha 13$ is also undersirable.

Figure 6A:
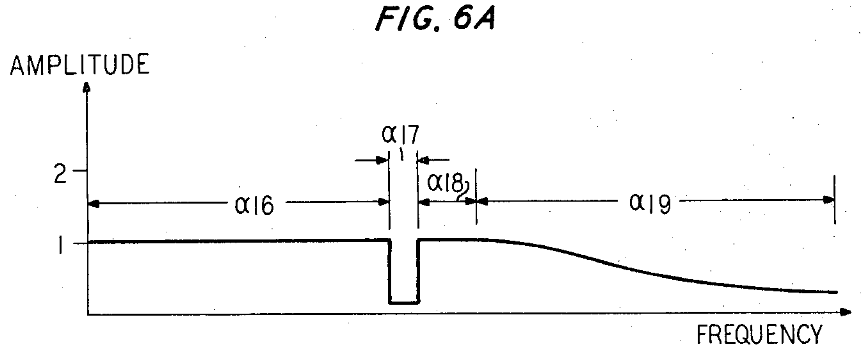
FIGS. 6A, 6B and 6C illustrate a possible set of spectra at various points within the system of FIG. 4.

The improved noise spectrum equalizer of this invention responds differently to applied spectra, thus yielding much improved results. FIG. 6A shows the output signal of bounded inverter 10. Regions $\alpha 16$ and $\alpha 18$ of FIG. 6A exhibit a relatively flat signal, which corresponds to the flat spectrum of regions $\alpha 1$ and $\alpha 3$. Region $\alpha 17$ displays a very small signal, which is the inverse of the large signal in region $\alpha 2$, and, region $\alpha 18$ has a declining signal which corresponds to rising spectrum of region $\alpha 4$.

Figure 6B:
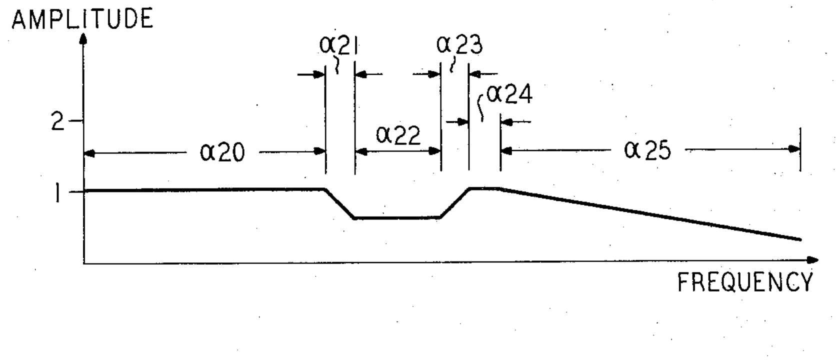

In response to the bounded inverter 10 signal, FIG. 6A, averager 20 generates a neighborhood-mean equalizing signal, illustrated in FIG. 6B. The equalizing signal of regions $\alpha 20$ and $\alpha 24$ is flat corresponding to the flat spectrum inverse in regions $\alpha 16$ and $\alpha 18$ respectively. In region $\alpha 21$ the equalizing signal is declining in accordance with the gradual inclusion of the low amplitude inverted spectrum of region $\alpha 17$. In region $\alpha 22$ the equalizing signal is depressed and flat, corresponding to the total inclusion of the low signal in region $\alpha 17$. In region $\alpha 23$ the equalizing signal is rising, in accordance with the gradual exclusion of region $\alpha 17$ from the frequency window of averager 20, and, in region 25 the equalizing signal is declining in accordance with the declining inverted spectrum of region $\alpha 19$.

Figure 6C:
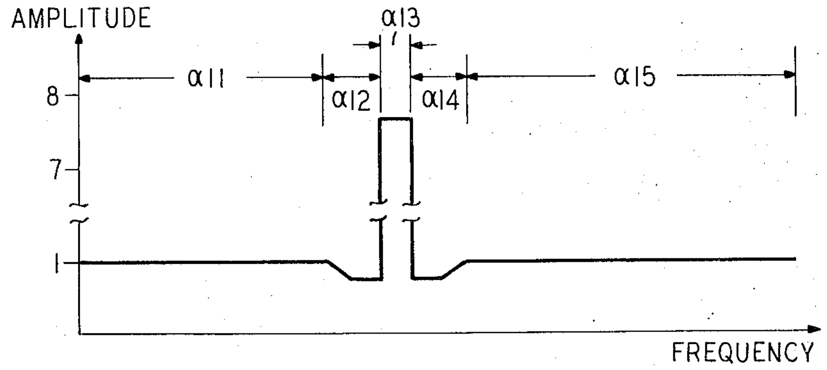

The final, equalized spectrum, which appears at the output of multiplier 40, is shown in FIG. 6C. It, of course, exhibits the same general characteristics as does the equalized spectrum shown in FIG. 5C, but quantitatively the characteristics of the instant invention indicate greatly improved performance. Namely, in FIG. 6C the strong signal is attenuated only to approximately 7.7 volts, (23 percent attenuation as compared to 70 percent attenuation in the prior art equalizer) and the spectrum is depressed in the neighborhood of the strong signal only to approximately 0.78 volt (22 percent depression as compared to 70 percent in the prior art equalizer). This approximately 200 percent performance improvement clearly demonstrates the advantages of this invention over the prior art apparatus.

It is to be understood that the embodiment shown and described herein is illustrative of the principles of this invention only and that modifications may be implemented by those skilled in the art without departing from the spirit and scope of the invention. For example, multiplier 40 may have substituted therefore a divider if delay means 30 is made responsive to the output of bounded inverter 10 rather than to the applied spectrum. Similarly, bounded inverter 10 may exhibit an inverse function other than the linear inverse function of the above embodiment, i.e., $1/x$, where $x$ is amplitude of the applied spectrum sample. For example, $A^{-x}$ may be a satisfactory inverse function, where A is any positive constant, which in addition to its inverse characteristics is naturally bounded.

What is claimed is:

1. A method for spectrum equalization of applied power spectrum samples representative of time functions containing periodic signals embedded in noise comprising the steps of:

inverting each of said applied power spectrum samples;

developing a neighborhood-mean equalizing signal associated with each of said power spectrum samples by forming an amplitude average of said inverted power spectrum samples in the vicinity of each of said applied spectrum samples; and multiplying each of said applied spectrum samples by said associated neighborhood-mean equalizing signals.

2. The method of equalizing applied power spectrum samples representative of time functions containing periodic signals embedded in noise comprising the steps of:

inverting each of said applied power spectrum samples;

obtaining a neighborhood-mean equalizing signal associated with each of said applied power spectrum samples by forming an amplitude average of a predetermined number of said inverted spectrum samples on either side of each of said applied power spectrum samples; and multiplying each of said applied power spectrum samples by said associated neighborhood-mean equalizing signals.

3. The method defined in claim 2 wherein the step of obtaining a neighborhood-mean equalizing signal further comprises the steps of:

developing a sum of said predetermined number of said inverted spectrum samples; and dividing said sum by the number of said inverted spectrum samples included in said sum.

4. The method defined in claim 3 wherein the step of inverting each of said applied power spectrum samples further comprises the steps of:

imposing a lower bound on each of said applied power spectrum samples; and inverting each of said applied power spectrum samples.

5. A method for spectrum equalization of applied power spectra composed of power spectrum samples comprising the steps of:

1. imposing a lower bound on the amplitude of said power spectrum samples;
2. inverting said bounded power spectrum samples;
3. forming a sum of adjacent N, a predetermined number, of said inverted spectrum samples at frequencies immediately below a selected spectrum sample, with adjacent N−1 of said inverted spectrum samples at frequencies immediately above said selected spectrum sample, and with said inverted spectrum sample of said selected spectrum sample;

4. dividing said sum by 2N;
5. multiplying said divided sum by the amplitude of said selected spectrum sample, thereby obtaining an equalized spectrum sample of said selected spectrum sample;
6. subtracting from said sum the spectrum sample of lowest frequency included in said sum and adding to said sum the spectrum sample adjacent to and higher than the highest frequency sample included in the sum;
7. selecting a new spectrum sample, adjacent to and at a higher frequency than said selected spectrum sample, to be equalized; and
8. repeating steps (3) through (7) thereby successively equalizing higher frequency selected spectrum samples until the highest frequency spectrum sample to be equalized is processed.

6. Apparatus for noise spectrum equalization of applied spectrum samples comprising:

means responsive to said applied spectrum samples for providing an inverse function of each of said applied spectrum samples;

means responsive to said inverted spectrum samples for developing neighborhood-mean equalizing signals associated with each of said applied spectrum samples; and means responsive to said applied spectrum samples and to said associated neighborhood-mean equalizing signals for generating a product of each of said spectrum samples and said associated neighborhood-mean signals, thereby obtaining equalized spectrum samples.

7. The apparatus defined in claim 6 wherein said inverse means exhibits a transfer characteristic of the form $f = A^{-x}$ where $x$ is the amplitude of said applied spectrum samples, $A$ is a constant, and $f$ is the inverse means output signal.

8. The apparatus defined in claim 6 wherein said inverse means further comprises:

means for applying a lower bound on the amplitude of said applied spectrum samples to develop bounded spectrum samples; and inverter means, responsive to said bounded spectrum samples for providing a linear inverse of said bounded spectrum samples.

9. Apparatus for noise spectrum equalization of applied spectrum samples comprising:

inverse means responsive to said applied spectrum samples for placing a lower bound on said applied spectrum samples and for providing a linear inverse of each of said applied spectrum samples, thereby developing bounded inverted spectrum samples;

averager responsive to said bounded inverted spectrum samples for providing neighborhood-mean equalizing signals by computing the average amplitude of said bounded inverted spectrum samples within a preselected width frequency window associated with and centered about each of said applied spectrum samples; and divider responsive to said applied spectrum samples and to said associated neighborhood-mean equalizing signals for generating a quotient of said associated neighborhood-mean equalizing signals and each of said bounded inverted spectrum samples, thereby obtaining equalized spectrum samples.

10. Apparatus for noise spectrum equalization of applied spectrum samples comprising:

bounding means responsive to said applied spectrum samples for applying a lower bound on said applied spectrum samples;

inverse means responsive to the output of said bounding means for providing an inverse of each of said bounded spectrum samples thereby generating inverted spectrum samples;

averager responsive to said inverted spectrum samples for providing neighborhood-mean signals of said inverted spectrum samples within a frequency window of 2N samples about each of said applied spectrum samples;

delay means responsive to said applied spectrum samples for storing and delaying said applied spectrum samples for a time interval corresponding to the application of N of said applied spectrum samples; and multiplier responsive to said delayed spectrum samples and to said neighborhood-mean signals for generating a product of said delayed spectrum samples and said neighborhood-mean signals, thereby generating equalized spectrum samples.

* * * * *